W. G. THOMAS.
AUTOMOBILE SIGNAL.
APPLICATION FILED APR. 2, 1919.
1,337,572.
Patented Apr. 20, 1920.
2 SHEETS—SHEET 1.
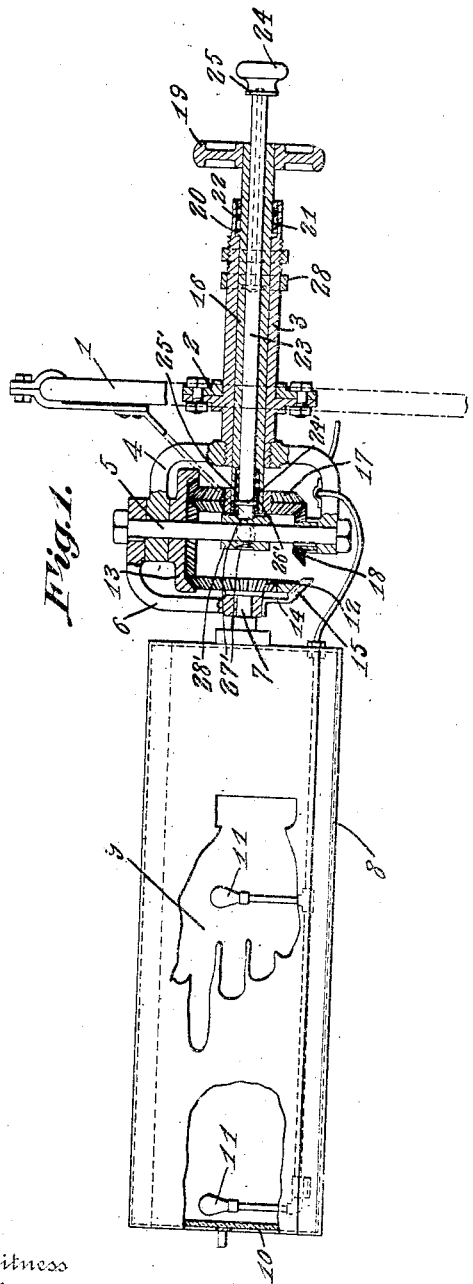
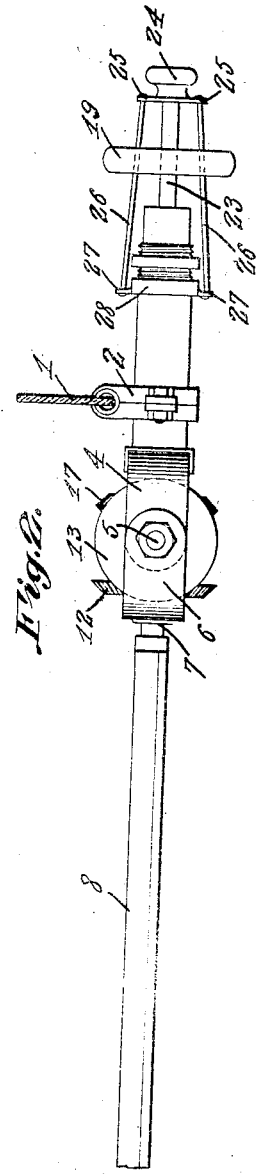
W. G. Thomas, Inventor
Witness
F. B. Worden
By C. A. Snow & Co.
Attorneys W. G. THOMAS.
AUTOMOBILE SIGNAL.
APPLICATION FILED APR. 2, 1919.
1,337,572.
Patented Apr. 20, 1920.
2 SHEETS—SHEET 2.
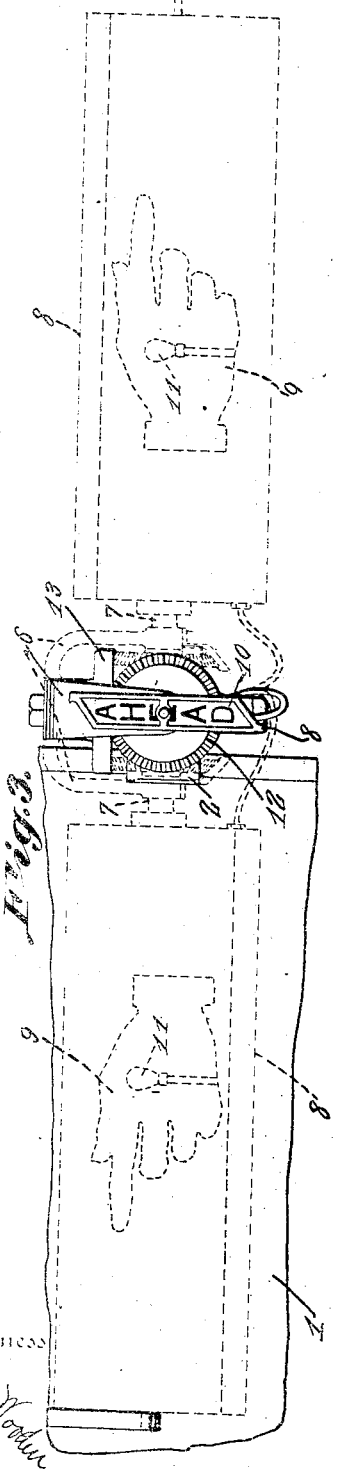
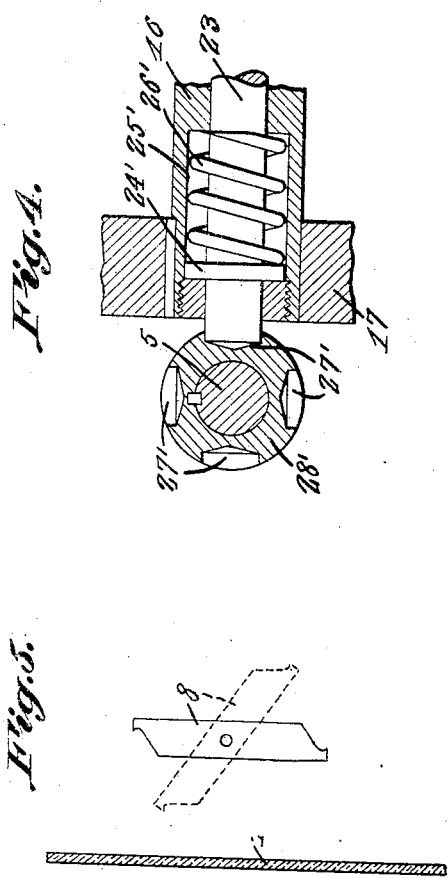
W. G. Thomas, Inventor

UNITED STATES PATENT OFFICE.

WILLIAM G. THOMAS, OF WEST PITTSTON, PENNSYLVANIA.

AUTOMOBILE-SIGNAL.

1,337,572.　　　　　Specification of Letters Patent.　　Patented Apr. 20, 1920.

Application filed April 2, 1919. Serial No. 286,937.

*To all whom it may concern:*

Be it known that I, WILLIAM G. THOMAS, a citizen of the United States, residing at West Pittston, in the county of Luzerne and State of Pennsylvania, have invented a new and useful Automobile-Signal, of which the following is a specification.

This invention relates to signals for use on vehicles to indicate the direction in which the vehicles are to be moved, one of the objects being to provide a simple and compact structure of this character which can be applied readily to a wind shield, is constantly under the control of the driver and can be quickly shifted to point toward either side or forwardly, or can be rotated to form a shield to protect the driver from the elements and from glaring lights, giving him a clear vision under all conditions.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a view partly in elevation and partly in section showing the indicator extended forwardly.

Fig. 2 is a plan view of the device, a portion of the wind shield being shown in section.

Fig. 3 is a front elevation of the indicator, two of its positions being indicated by dotted lines.

Fig. 4 is an enlarged section through the lock of the indicator.

Fig. 5 is a diagram showing the indicator adjusted to position for use as a shield.

Referring to the figures by characters of reference, 1 designates a portion of a wind shield one side of which is engaged by a clamp 2 carrying a bearing sleeve 3 extending beyond the front and back faces of the shield. The front end of the sleeve 3 has a yoke 4 in which a vertical stem 5 is mounted for rotation, and secured to this stem, so as to rotate therewith, is an arm 6 having a shaft 7 journaled in the free end portion thereof and held in alinement with the longitudinal center of the sleeve 3. An elongated lamp housing is secured at one end to and is supported by the shaft 7, as indicated at 8, this housing being provided with a transparent portion 9 which can be in the form of a pointing hand, an arrow or the like. The said pointing portion 9 is so located that, when the housing is extended laterally beyond the wind shield it can be seen from the rear and will point to the left. When the housing is swung to position in front of the wind shield and parallel therewith, however, the said portion 9 will point to the right and can be seen by persons approaching the vehicle from in front thereof. The free end of the housing is transparent and can contain the word "Ahead", as shown at 10. Lamps 11 are located in the housing for illuminating the transparent portions thereof and are suitably connected by loose conductors to sources of energy.

A beveled gear 12 is secured to the shaft 7 and constantly meshes with a gear 13 loosely mounted on the stem 5, and extending from the arm 6 is a spring finger 14 carrying a brake shoe 15 adapted to frictionally engage the teeth of the gear 12 and hold it against accidental rotation.

A tubular shaft 16 is mounted to slide and rotate in the sleeve 3 and secured to one end of this shaft 16 is a two faced gear 17 normally meshing with a gear 18 secured to and revoluble with the stem 5. A hand wheel 19 is secured to the outer end of the shaft 16 and constitutes means for rotating it and an annular collar 20 is formed on the said shaft and is positioned loosely within a counterbore 21 formed in the outer end of the sleeve 3. A spring 22 is located in the counterbore and bears at one end against the collar 20 and at its other end against a ring seated in the outer end of the counterbore. Thus the shaft 16 is normally pressed toward the stem 5 and gear 17 is held normally in mesh with the gear 18.

A rod 23 is slidably mounted in the shaft 16 and is provided at its outer end with a knob 24 having oppositely extending ears 25. Rods 26 connect these ears with ears 27 extending laterally from a ring 28 secured on the sleeve 3 and the said rods 26 extend between the spokes of the wheel 19 so that the rod 23 and wheel will rotate together although independent sliding movement of said rod and of shaft 16 is permitted. The rod 23 has a collar 24' near its inner end which is slidably mounted in a counterbore 25' in the inner end portion of the shaft 16, there being a spring 26' seated in the counterbore and bearing against the collar, as shown in Fig. 4. Thus the inner end of rod 23, which can be tapered as shown, will be normally seated in one of a series of recesses 27' formed in a collar 28' secured to the stem 5.

The housing 8 is normally extended forwardly from the windshield and is locked against movement by rod 23 engaging the collar 28. When it is desired to turn the vehicle to the left the driver pulls on the knob 24 so as to disengage the rod 23 from the collar 28. He then rotates the rod 23 and the wheel 19 with the result that the gear 17 will rotate gear 18 and stem 5 and cause the housing 8 to swing to the left, thereby exposing the pointer 9 to the view of a driver approaching from the rear. When the vehicle is to be turned to the right the housing is swung in the same manner to the right and in front of and parallel with the windshield, thereby exposing the pointer 9 to the view of a person approaching the vehicle from in front thereof. While the housing is in this position it can be swung about its longitudinal axis by pulling shaft 16 longitudinally without disturbing the locking rod 23. This will bring gear 17 into mesh with gear 13. By then rotating the shaft 16 motion will be transmitted through the gears to gear 12 and the shaft 7 caused to rotate to tilt the housing, as shown for example in Fig. 5. When in this position the housing will act as a shield to protect the driver from glare.

The device is constantly under the control of the driver, can be shifted quickly and accurately, and serves as an efficient signal both day and night. While it has been shown and described attached to a wind shield, it is to be understood that, when used with closed cars, it can be built into the body so as to form a permanent part thereof.

What is claimed is:—

1. The combination with a supporting structure, of an indicating member mounted to swing laterally relative thereto, a shaft mounted to slide and rotate relative to the supporting structure, means operated by the rotation of the shaft when slid to one extreme position, for swinging the member laterally to direction indicating positions, and means operated by the rotation of the shaft when slid to its other extreme position, for tilting the member about its longitudinal axis.

2. The combination with a supporting structure, of an indicating member mounted to swing laterally relative thereto, a shaft mounted to slide and rotate relative to the supporting structure, means operated by the rotation of the shaft when slid to one extreme position, for swinging the member laterally to direction indicating positions, means operated by the rotation of the shaft when slid to its other extreme position, for tilting the member about its longitudinal axis a locking rod slidable within and revoluble with the shaft, and means coöperating with the rod for securing the member against swinging movement.

In testimony that I claim the foregoing as my own, I have hereto affixed my signature in the presence of two witnesses.

WILLIAM G. THOMAS.

Witnesses:
B. H. HENNING,
WILLIAM H. LA BAR.